(12) United States Patent
San Martin et al.

(10) Patent No.: US 10,641,594 B2
(45) Date of Patent: May 5, 2020

(54) CORROSION DETECTION TOOL PROCESSING METHOD

(71) Applicant: Halliburton Energy Services, Inc., Houston, TX (US)

(72) Inventors: Luis Emilio San Martin, Houston, TX (US); Reza Khalaj Amineh, Houston, TX (US); Ahmed E. Fouda, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 87 days.

(21) Appl. No.: 15/747,314

(22) PCT Filed: Aug. 18, 2017

(86) PCT No.: PCT/US2017/047546
§ 371 (c)(1),
(2) Date: Jan. 24, 2018

(87) PCT Pub. No.: WO2018/035428
PCT Pub. Date: Feb. 22, 2018

(65) Prior Publication Data
US 2019/0003815 A1 Jan. 3, 2019

Related U.S. Application Data

(60) Provisional application No. 62/377,185, filed on Aug. 19, 2016.

(51) Int. Cl.
*G01N 17/00* (2006.01)
*G01B 7/06* (2006.01)
(Continued)

(52) U.S. Cl.
CPC ............... *G01B 7/06* (2013.01); *G01N 17/02* (2013.01); *G01N 27/20* (2013.01); *G01N 27/82* (2013.01)

(58) Field of Classification Search
CPC .......... G01B 7/06; E21B 41/00; G01N 17/02; G01N 27/82
(Continued)

(56) References Cited

U.S. PATENT DOCUMENTS 5,157,605 A 10/1992 Chandler et al.
7,960,969 B2 6/2011 Mouget et al.
(Continued)

FOREIGN PATENT DOCUMENTS

EP 2896782 A1 7/2015
WO 2016/007938 A1 1/2016
(Continued)

OTHER PUBLICATIONS

Doll, H. G. "Introduction to induction logging and application to logging of wells drilled with oil base mud." Journal of Petroleum Technology 1.06 (1949): 148-162.
(Continued)

*Primary Examiner* — Melissa J Koval
*Assistant Examiner* — Courtney G McDonnough
(74) *Attorney, Agent, or Firm* — Benjamin Fite; Baker Botts L.L.P.

(57) ABSTRACT

A corrosion detection system for a pipe may include a corrosion detection tool. The corrosion detection tool may include a transmitter and a receiver. The transmitter and receiver have measurements associated with each and these measurements may be used to determine an impedance. Derived constants match a numerical model that is based on the measurements associated with the transmitter and the nominal thickness of the pipe. The information related to the thickness of a pipe surrounding the corrosion detection is based on the derived constants and the impedance. This thickness of the pipe may be used to determine if a section of a pipe has a defect, such as, corrosion.

20 Claims, 5 Drawing Sheets

(51) Int. Cl.
*G01N 27/82* (2006.01)
*G01N 17/02* (2006.01)
*G01N 27/20* (2006.01)

(58) Field of Classification Search
USPC .......................................................... 324/700
See application file for complete search history.

(56) References Cited

U.S. PATENT DOCUMENTS

| | | | |
|---|---|---|---|
| 8,326,539 | B2 | 12/2012 | Morrison et al. |
| 2009/0195244 | A1* | 8/2009 | Mouget ................ G01V 3/28 324/221 |
| 2010/0017137 | A1 | 1/2010 | Legendre et al. |
| 2015/0127274 | A1 | 5/2015 | Legendre et al. |
| 2015/0338541 | A1 | 11/2015 | Nichols et al. |
| 2016/0168975 | A1 | 6/2016 | Donderici et al. |
| 2016/0187523 | A1 | 6/2016 | San Martin et al. |
| 2017/0176629 | A1* | 6/2017 | Omeragic ............. G01V 3/28 |

FOREIGN PATENT DOCUMENTS

| | | |
|---|---|---|
| WO | 2017/196357 A1 | 11/2017 |
| WO | 2017/196371 A1 | 11/2017 |

OTHER PUBLICATIONS

Rourke, Marvin, Yong Li, and Glyn Roberts. "Multi-tubular corrosion inspection using a pulsed eddy current logging tool." IPTC 2013: International Petroleum Technology Conference. 2013.
Acuña, Irlec Alexandra, et al. "Scanning for downhole corrosion." Oilfield Review 22.1 (2010): 42-50.
International Search Report and Written Opinion issued in related PCT Application No. PCT/US2017/047546 dated Nov. 29, 2017, 17 pages.
Extended European Search Report issued in related EP application No. 17842190.5, dated Jan. 29, 2020 (5 pages).

* cited by examiner

CORROSION DETECTION TOOL PROCESSING METHOD

CROSS-REFERENCE TO RELATED APPLICATION

The present application is a U.S. National Stage Application of International Application No. PCT/US2017/047546 filed Aug. 18, 2017, which claims benefit of U.S. Provisional Patent Application No. 62/377,185 filed Aug. 19, 2016, both of which are incorporated herein by reference in their entirety for all purposes.

TECHNICAL FIELD OF THE INVENTION

The invention relates to one or more wellbore operations and more specifically to a corrosion detection tool with buck and non-bucked receivers and the processing of data therefrom.

BACKGROUND OF THE INVENTION

Once a drill string has been removed from a borehole, any one or more operations may be conducted including one or more logging operations. For at least one of these operations, the thickness, or estimation of the thickness, of the pipe at any one or more sections disposed within the borehole may be required. The thickness of the pipe may also be used to determine whether a portion or segment of the pipe has a defect. Previous processing of induction logging tool data for determination of conductivity of formations is not adequate for detection of certain defects in the pipe, for example, corrosion.

DETAILED DESCRIPTION

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

For purposes of this disclosure, an information handling system may include any instrumentality or aggregate of instrumentalities operable to compute, classify, process, transmit, receive, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
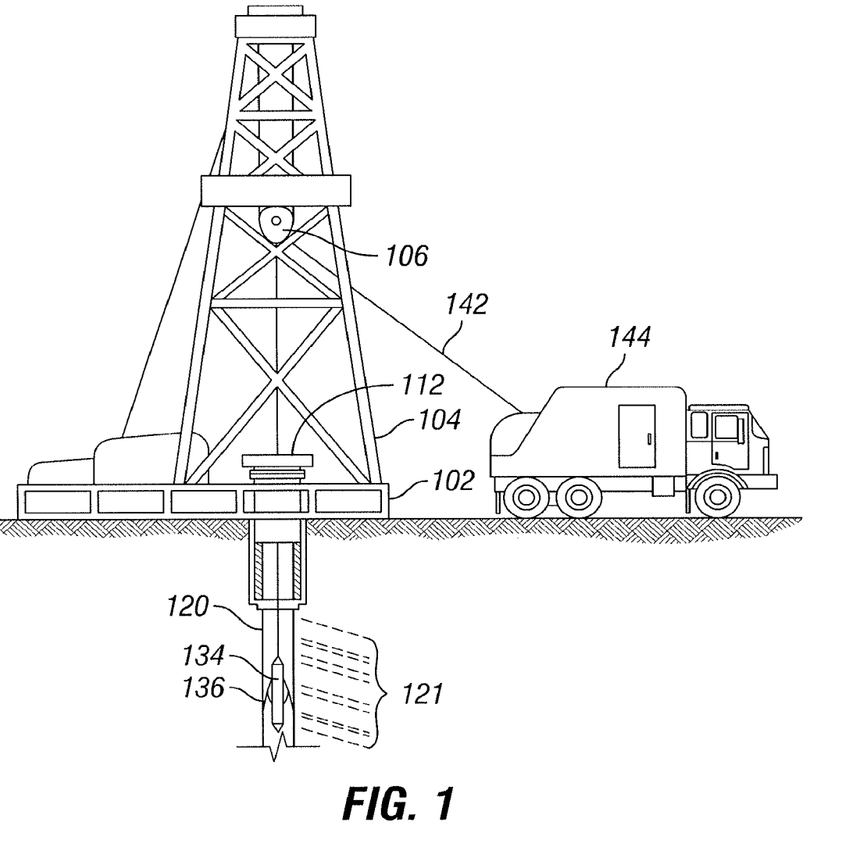
FIG. 1 is an illustrative wireline environment for utilization of a corrosion detection tool, according to aspects of the present disclosure.

At various times during the drilling process, a drill string is removed from the borehole as shown in FIG. 1. Once the drill string has been removed, various operations including logging operations can be conducted. A drilling platform 102 is equipped with a derrick 104 that supports a hoist 106 for raising and lowering a wireline or cable 142. A corrosion detection tool 134 may be deployed or conveyed downhole in a wellbore 120 through various formations 112 via a cable 142. As used herein, cable 142 may comprise a cable, a wireline, a slickline, coiled tubing, downhole robot, or any other suitable device for deploying the corrosion detection tool 134. In one or more embodiments, cable 142 may comprise conductors for transporting power to the corrosion detection tool 134. Wellbore 120 may comprise a casing, for example, a cement casing. The corrosion detection tool 134 may have centralizing arms 136 that center the corrosion detection tool 134 within the borehole. A logging facility 144 (shown in FIG. 1 as a truck, although it may be any other structure) may collect measurements from the corrosion detection tool 134. In one or more embodiments, corrosion detection tool 134 may utilize telemetry, a repeater, a communications line, or any other device to communicate information to the logging facility 144. In one or more embodiments, the corrosion detection tool 134 may store one or more measurements gathered, collected or measured by corrosion detection tool 134 in a memory and the memory may subsequently be retrieved, for example, after the corrosion detection tool 134 has been retrieved to the surface. In one or more embodiments, any one or more of a communications line or a memory may be utilized by the corrosion detection tool 134. The logging facility 144 may include computing facilities for processing and storing any one or more measurements gathered, collected or measured by the corrosion detection tool 134. Logging facility 144 may comprise an information handling system, communicate information to a remote information handling system, or both.

Figure 2:
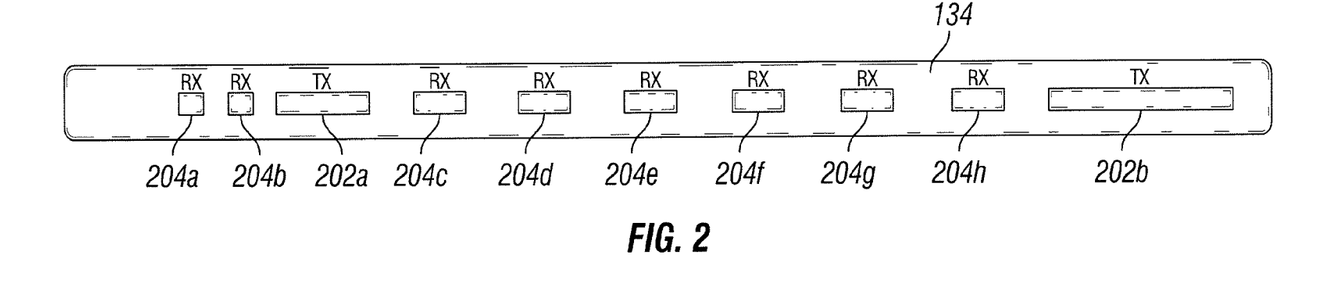
FIG. 2 is a diagram of an example corrosion detection tool, according to aspects of the present disclosure.

This disclosure proposes a new processing for the data of a multi-receiver corrosion detection tool with buck and non-bucked receivers. In FIG. 2, a possible design of a corrosion detection tool is presented. The corrosion detection tool is intended to determine the thickness of each of the different pipes in the configuration with possibly multiple pipes, as shown in FIG. 3.

FIG. 2 is a diagram of an example corrosion detection tool 134, according to aspects of the present disclosure. In one or more embodiments, any one or more receivers 204 may be disposed at a separate location from any one or more transmitters 202, collocated, or any combination thereof. For example, as shown, the corrosion detection tool 134 may comprise two transmitters 202a and 202b (collectively "transmitters 202") and eight receivers 204a, 204b, 204c, 204d, 204e, 204f, 204g and 204h (collectively "receivers 204") as illustrated. In one or more embodiments, the corrosion detection tool 134 may comprise any one or more transmitters 202, any one or more receivers 204, or any combination thereof. In one or more embodiments, any one or more of the receivers 204 could be bucked (not shown). Other possible designs are shown in FIG. 3.

Figure 3A:
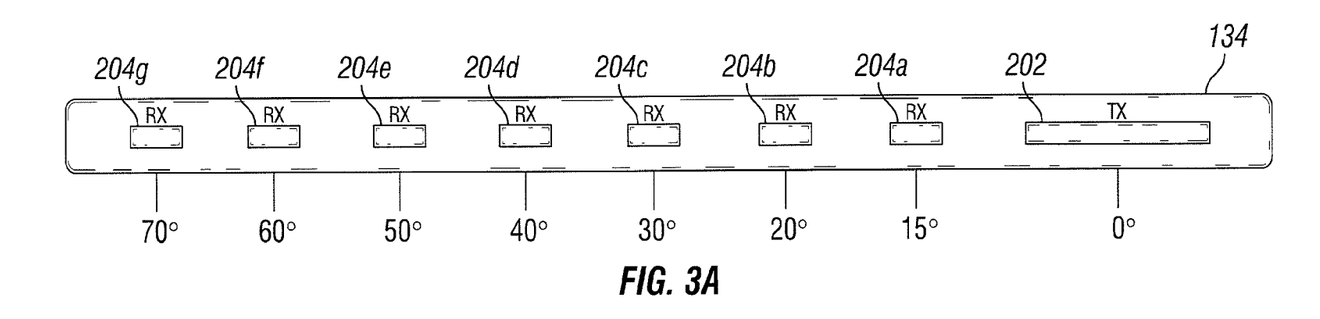
FIGS. 3A-3C are diagrams illustrating an example corrosion detection tool, according to aspects of the present.
Figure 3B:
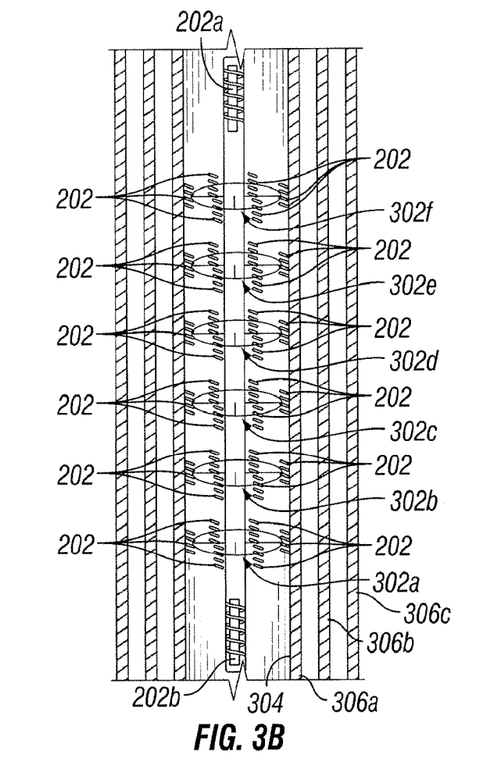
Figure 3C:
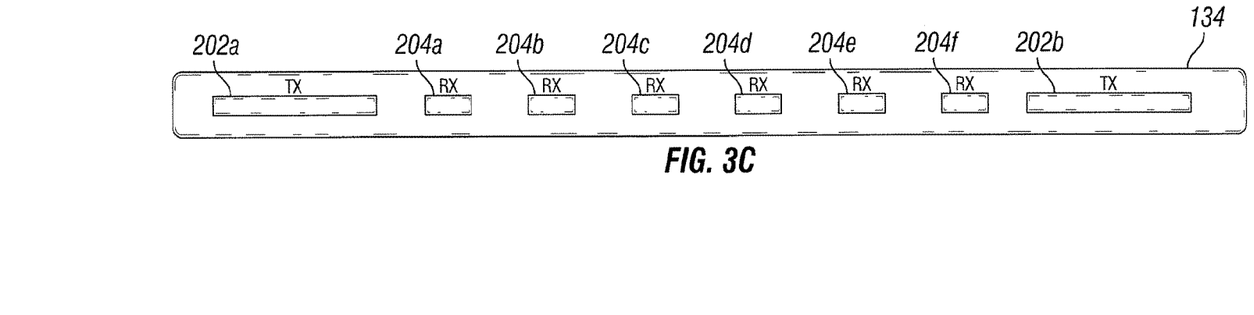

FIG. 3A, FIG. 3B and FIG. 3C are diagrams illustrating example corrosion detection tools, according to aspects of the present invention. FIG. 3A, FIG. 3B and FIG. 3C illustrate three examples of corrosion detection tools. In FIG. 3A a corrosion detection tool 134 with a single transmitter 202 and seven receivers 204a, 204b, 204c, 204d, 204e and 204f is illustrated. In one or more embodiments, receivers 204a, 204b, 204c, 204d, 204e, 204f and 204g may be spaced apart at 15 inches (or 38.1 centimeters), 20 inches (50.8 centimeters), 30 inches (76.2 centimeters), 40 inches (101.6 centimeters), 50 inches (127 centimeters), 60 inches (152.4 centimeters) and 70 inches (177.8 centimeters), respectively from the transmitter 202. FIG. 3B is a corrosion detection tool 134 with six sets of receivers, 302a, 302b, 302c, 302d, 302e and 302f (collectively, "set of receivers 302"), with each set of receivers 302 comprising one or more receivers 202, each of the sets of receivers 302 close to the inner surface 304 of the innermost pipe 306a (where pipe 306a is the innermost pipe of pipes 306a, 306b and 306c) and two transmitters 202a and 202b. This corrosion detection tool 134 has azimuthal sensitivity. FIG. 3C is a corrosion detection tool 134 with two transmitters 202a and 202b placed in a symmetric configuration with six receivers, 204a, 204b, 204c, 204d, 204e and 204f, positioned between the two transmitters 202a and 202b. Other corrosion detection tool 134 designs that can benefit from one or more aspects of the present disclosure are possible.

Figure 4:
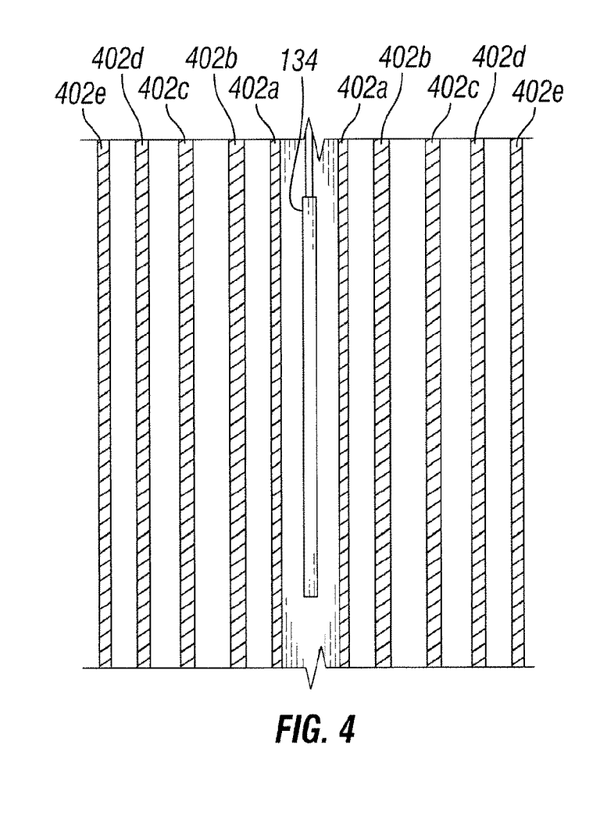
FIG. 4 is a diagram of an example corrosion detection tool within a multi-pipe configuration, according to aspects of the present disclosure.

FIG. 4 is a diagram of an example corrosion detection tool 134 within a multi-pipe (pipes 402a, 402b, 402c, 402d and 402e (collectively "pipes 402")) configuration, according to aspects of the present disclosure. The purpose of the corrosion detection tool 134 is to determine the thickness of each of the pipes 402 in the configuration with possibly multiple pipes, as shown in FIG. 4.

The measurements of the corrosion detection tool 134 in FIG. 2 are the current and applied voltage of every transmitter 202 and the voltage of every receiver 204. The voltage in receivers 204 may be represented as V1, . . . Vn. The current in transmitters 202 may be represented as I1, . . . , IM. The applied voltage in transmitters 202 may be represented as AV1, . . . , AVm.

The information about the thickness of the surrounding pipes, for example, pipes 402, is contained in the impedances measured by the corrosion detection tool 134. If the two or more transmitters, for example, transmitters 202, are located a sufficient or determined distance from each so that each of the receivers, for example, receivers 204, receives significant signals or signals of threshold strength from one or more fields induced from only one transmitter 202, then the two or more transmitters 202 may emit or generate any set of or one or more frequencies without restriction. If the two or more transmitters 202 are located a sufficient or determined distance from each other, then two or more transmitters 202 may emit or generate a different set or one or more frequencies. These are the ratios of the receiver voltages divided by the transmitter current. In case there is more than one transmitter 202 the ratios should be between the voltage generated by a given transmitter 202 divided by the current of that transmitter 202. To include the possibility of having more than one transmitter 202 we introduce one more index in the voltages to indicate the transmitter 202. The impedances are:

$$IMPij = Vij/Ij,$$

where the indexes i=1, . . . , n and j=1, . . . , m.

The applied voltages on the transmitters AVj, with j=1, . . . , m, can be divided by the corresponding currents to generate the impedances of the transmitters coupled to the pipes to generate an additional measurement which is sensitive to the coupling between the transmitter and the surrounding pipes. These measurements are:

$$T\_IMPj = AVj/Ij.$$

One can also add a receiver, for example receiver 204, at the same position as the transmitter, for example, transmitter 202, that may have one or more taps to measure multiple voltages. The receiver 204 located at the same place of a transmitter 202 measures the magnetic flux generated by the transmitter, which flows through the magnetic core of the transmitter, the pipes and the gaps between them. The measurements generated by these receivers 204 are sensitive to defects in the pipes, for example, pipes 306 in FIG. 3B or pipes 402 in FIG. 4, in particular the differences between the voltages of these receivers 204 are more sensitive to defects in the inner pipes because the direct field is partially subtracted leaving the differences that are created by the defects in the pipes 306 or 402. If we call the receiver's voltages measured at the position of the transmitter TVjp, where j=1, . . . , m, and p=1, . . . , 1, where the index p indicate the different receivers 204 located at the same position of the transmitter 202 (multiple receivers 204 each overlapping with a part of a transmitter 202 that could be, for example, 5 to 20 inches long or 12.7 centimeters to 50.8 centimeters). The impedances associated with these measurements are:

$$TV\_IMPjp = TVjp/Ij,$$

$$DTV\_IMPjpq = (TVjp - TVjq)/Ij,$$

with p, q=1, . . . , 1.

The difference between the measurements AVj and TVj, where a sum over the index p of TVjp has been taken, is caused by the losses or non-linear behavior of the transmitter core. These two measurements can be used in the inversion of the measured data to find the best fit for the physical parameters of the pipes and the thicknesses of each of the pipes 306 or 402. In particular, the several receivers 204 that can be placed co-located with a transmitter 202, which for example could be 16 inches (or 40.64 inches) long, can be used to achieve high resolution in the first pipe, for example, pipe 306*a* of FIG. 3. Because the magnetic core of the transmitter 202 is segmented, receivers 204 that are collocated but at different positions, will measure slightly different, depending on the defects of the first pipe 306*a*. The differences between the measurements of these receivers 204 are ideal to detect defects in the first pipe 306*a*, because the larger direct field can be removed and as a result the effect of the defects on the first pipe 306*a* can be magnified. An example of increased resolution on the first pipe 306*a* would be a case with a 16 inch (or 40.64 centimeters) core segmented in 4 pieces of 4 inches (or 10.16 centimeters) each, with an different receiver on each core piece.

Figure 5:
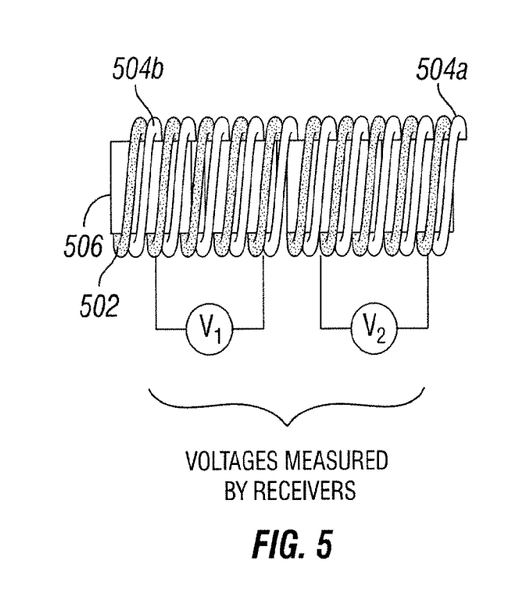
FIG. 5 is a diagram of an example transmitter with a segmented core and two receivers wound on the same core, according to aspects of the present disclosure.

FIG. 5 is a diagram of an example transmitter 502 with a segmented core 506 and two receivers (504*a* and 504*b* (collectively, "receivers 504") wound on the same core 506, according to aspects of the present disclosure. The voltages measured by the receivers 504 are indicated as V1 and V2. The number of receivers 504 at the transmitter location could be one, two, as indicated in FIG. 5, or more in cases of long receivers (16 inches (or 40.64 centimeters), for example). Here the receivers 504 are shown as separate but they can be made from a single winding, one voltage from one end to the middle and the other from the other end to the middle.

In the case of bucked receivers, a main coil and a bucking coil are wound, usually in opposite directions, so that when connected in series the induced voltages are subtracted from each other. The purpose of the subtraction is to remove the direct signal from the transmitter and this configuration is more useful for receivers located close to the transmitter, where the relative magnitude of the direct signal compared to the total signal is large. The signal obtained by subtraction of the voltages of the main and bucking coils is more sensitive to the defects in the pipes. Once the corrosion detection tool 134 is disposed in the pipes, precise cancellation may not be maintained. The schematic description of a bucked receiver is shown in FIG. 6.

Figure 6:
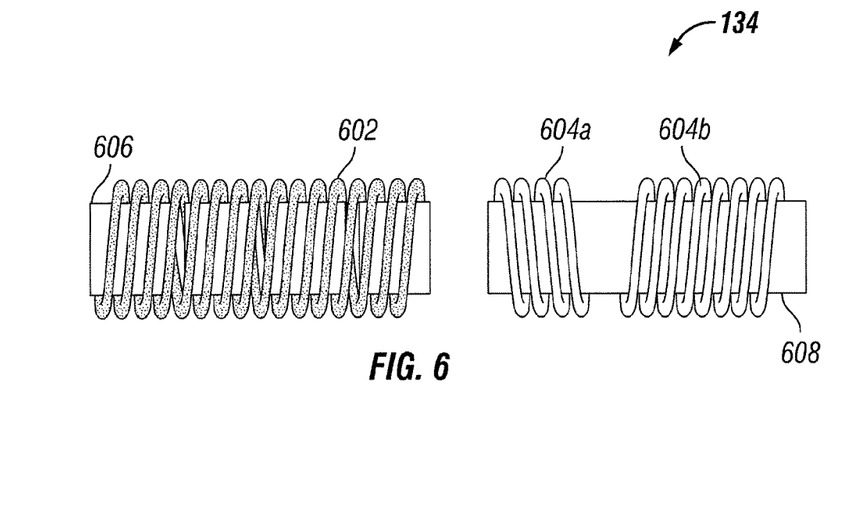
FIG. 6 is a diagram of an example transmitter with a segmented core and a bucked receiver, according to aspects of the present disclosure.

FIG. 6 is a diagram of an example transmitter 602 with a segmented core 606 and a bucked receiver 604*a*, according to aspects of the present disclosure. The transmitter 602 is shown wound on a segmented magnetic core 606 and the bucked receiver 604 is shown wound in a non-magnetic coil form 608. The main coil 604*b* and bucking coil 604*a* are shown wound in opposite directions. The main coil 604*b* and bucking coil 604*a* of the receivers (collectively, 604*a* and 604*b*) are connected together in series (not shown).

The measurements generated by a corrosion detection tool 134, as mentioned above are the voltages measured at the receivers V1, . . . , Vn and the currents and applied voltages in transmitters I1, . . . , Im, AV1, . . . , AVm. In the first step the data is calibrated and averaging and filtering of out of band noise are applied to the data. In case of frequency domain tools that use multiple frequencies, a step of quadrature detection can be used, in which case a reference for the phase needs to be used. The phase of the transmitter current or the phase of the voltage of the receiver located at the transmitter position can be chosen. After the quadrature detection is applied to extract the signals at each individual frequency (of the set of frequencies used by the transmitter) of each receiver voltage the extracted signals are complex with real and imaginary parts. In case of time domain tools, which operate with the transmitters emitting pulses, the receivers measure sufficient samples to accurately capture the decay of the field once the transmitter pulse is turned off. In this case, the decay signal comprises information associated with the thickness of the pipes.

After this preliminary processing, the next step is the generation of the impedances IMPij, T_IMP, TV_IMPjp, DTV_IMPjpq, defined above.

After the impedances as functions of position have been obtained, the next step is a normalization step that involves the estimation of average magnetic permeability and electrical conductivity of the pipes and the derivation of constants to match a numerical model to the measured responses of the transmitter core (for example, segmented magnetic core 606) and pipes at a point of nominal thickness. This numerical model is the one used in the processing as either a precomputed stored table or as a forward solver. Another variable to normalize for is the cancellation between main and bucking coils (for example, main coil 604*b* and bucking coil 604*a*). The level of the response of the bucked coils 604*a* depends on the level of cancellation between main coil 604*b* and bucking coil 604*a*. The level of cancellation, which depends on the distance between the main coil 604*b* and bucking coil 604*a* can be a variable adjusted to match modeling and measurement. The numerical model can be based on a linear or nonlinear model that captures the nonlinearity of the core and pipes.

In one or more embodiments, a next step may use deconvolution to process the impedances. The purpose of the deconvolution is to eliminate the double indication of defects for small defects or, in general, improve the vertical resolution of the corrosion detection tool 134.

After the measurements have been matched to a numerical modeling, after which a deconvolution may be applied, the next step of processing can be either an inversion to evaluate the individual pipes thicknesses or a remote field eddy current processing (RFEC) to find the total metal thickness. The RFEC requires less computation and therefore it is better suited for a real time solution.

Figure 7:
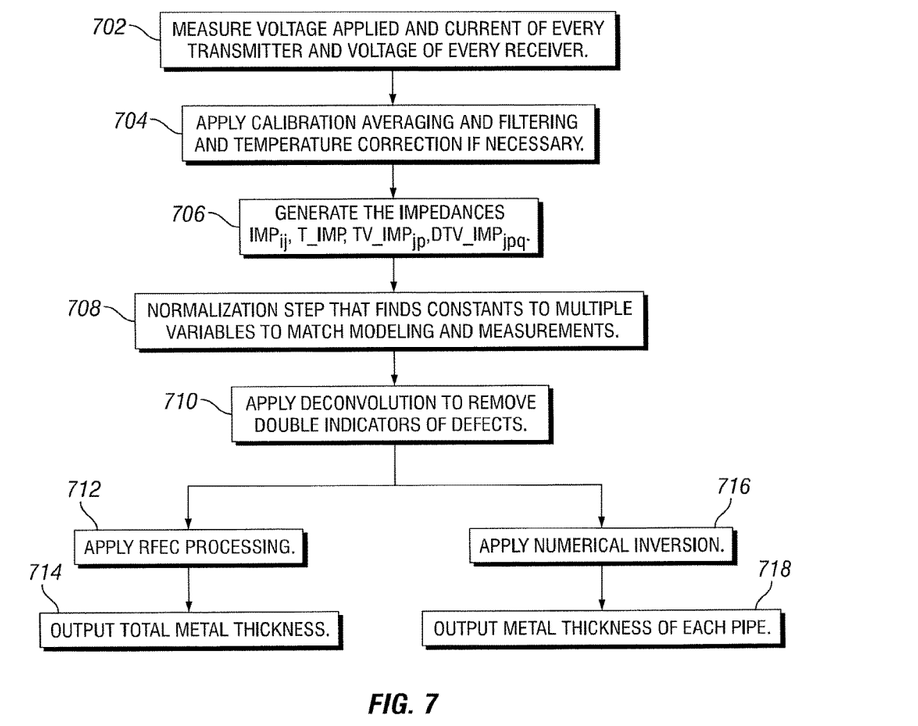
FIG. 7 is a flow diagram of the processing of data acquired by an example corrosion detection tool, according to aspects of the present disclosure.

FIG. 7 is a flow diagram of the processing of data acquired by an example corrosion detection tool, according to aspects of the present disclosure. In FIG. 7 a flow diagram of the processing is shown, with two options one for RFEC and one for inversion. For steps 712-718, two options are shown depending on the type of processing applied RFEC or numerical inversion. At step 702, the voltage applied and current of every transmitter and voltage of every receiver is measured. At step 708, calibration averaging and filtering and temperature correction are applied if necessary. At step 706, the impedances IMPij, T_IMP, TV_IMPjp, DTV_IMPjpq are evaluated. At step 708, a normalization step that finds constants to multiple variables to match modeling and measurements is performed. At step 710, deconvolution to remove double indicators of defects is applied. After step 710 either RFEC processing is applying at step 712 followed by outputting of total metal thickness at step 714 is performed or a numerical inversion is applied at step 716 followed by outputting metal thickness of each pipe.

Any one or more aspect of the present disclosure are especially suited to estimate quantitatively the thickness of pipes in configurations with multiple pipes of 4, 5 or more pipes as well as the standard cases of 1, 2 and 3 pipes. There is currently no tool available in the market to estimate the thickness in configurations with large number (4, 5 or more) of concentric pipes.

This new receivers collocated with the transmitter could reduce the cost of acquiring high resolution measurements.

Any one or more aspects or embodiments of the present disclosure can deliver unprecedented accuracy of thickness estimation.

Two types of electromagnetic (EM) induction tools exist, the frequency domain tools and the time domain tools. The one or more aspects or embodiments discussed herein could apply to either of them.

Unlike previous disclosures on the processing of the corrosion detection tool, this disclosure proposes the use of impedances for the derivation of the thicknesses of the pipes.

New measurements are proposed to increase the resolution on detection of first pipe defects. These measurements are obtained by receivers collocated with transmitters, operating in the frequency domain, which have not been included in previous disclosures of the processing of the frequency domain tool data for the derivation of the thickness of each individual pipe in a multi-pipe configuration.

Any one or more aspects or embodiments of the present disclosure can be applied to one or more corrosion detection tools. Data of each array may be processed with deconvolution to improve the vertical resolution of the tool in defect detections and thickness estimations. Inversion is used to recover the thicknesses of individual pipes.

Any one or more aspects or embodiments of the present disclosure can be used to find corrosion in the 4th or 5th tubular, quantitatively which is a service not currently offered by any service company, as well as the standard quantitative thickness of a first, second and third pipes.

Previous processing of induction logging tool data for determination of conductivity of formations is not adequate for corrosion detection tools as discussed herein. The type of formations and the theory applied in induction logging are very different. Formation conductivity in induction logging ranges between 0.0001 and 20 Siemens/meter (S/m) while in the pipe corrosion problem, pipe conductivity is of the order of 10,000,000 S/m. The frequencies used in induction logging are in the kiloHerz (kHz) range completely different to the frequencies used in corrosion detection that range between 0.1 and 20 Herz (Hz) for multiple pipes and 20 to 1000 Hz for first pipe. In induction logging is essential to use bucking coil to cancel the direct field but in this application bucking coils can be used to improve sensitivity but are not indispensable. The physics of induction logging and corrosion detection are completely different. In addition to that the specific sequence of steps that we apply in the processing disclosed here has not been previously described in the literature in either of the two disciplines corrosion detection or in induction logging.

The foregoing description of certain aspects, including illustrated aspects, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A corrosion detection system for at least one pipe, comprising:
    a corrosion detection tool comprising:
        one or more transmitters, wherein at least one of the one or more transmitters is located at a position about the corrosion detection tool; and
        one or more receivers, wherein at least one of the one or more receivers is located at the position;
    an information handling system communicatively coupled to the corrosion detection tool, the information handling system comprises a processor and a memory coupled to the processor, the memory containing a set of instructions that, when executed by the processor, cause the processor to:
        receive one or more measurements associated with a transmitter voltage applied to and a transmitter current of each of the one or more transmitters and one or more measurements associated with a receiver voltage of each of the one or more receivers;
        determine one or more impedances associated with the one or more measurements associated with the one or more transmitters and the one or more measurements associated with the one or more receivers;
        estimate an average magnetic permeability and electrical conductivity of the at least one pipe and derive one or more constants to match a numerical model that captures nonlinearity of the at least one pipe and the one or more measurements, wherein the numerical model is based, at least in part, on the one or more measurements associated with the one or more transmitters and the at least one pipe at a nominal thickness; and
        generate information related to a thickness of one or more pipes surrounding the corrosion detection tool based, at least in part, on the one or more derived constants and the one or more determined impedances.

2. The corrosion detection system for the at least one pipe of claim 1, wherein the one or more receivers comprise one or more taps, wherein the one or more taps measure the receiver voltage of the one or more receivers, and wherein at least one of the one or more receivers is disposed at a location of at least one of the one or more transmitters.

3. The corrosion detection system for the at least one pipe of claim 1, wherein the one or more transmitters comprise a single transmitter, and wherein the one or more receivers comprise a plurality of receivers.

4. The corrosion detection system for the at least one pipe of claim 1, wherein the one or more receivers comprise six receivers disposed in proximity to an inner surface of an innermost one of the at least one pipe.

5. The corrosion detection system for the at least one pipe of claim 1, wherein the one or more transmitters comprise two transmitters disposed in a symmetric configuration.

6. The corrosion detection system for the at least one pipe of claim 1, wherein the set of instructions that, when executed by the processor, further cause the processor to:
    apply at least one of a calibration averaging, a filtering and a temperature correction.

7. The corrosion detection system for the at least one pipe of claim 1, wherein the set of instructions that, when executed by the processor, further cause the processor to:
    deconvolve the one or more impedances.

8. A method for determining corrosion of a pipe, comprising:
    deploying a corrosion detection tool downhole, wherein the corrosion detection tool comprises one or more transmitters and one or more receivers;
    receiving one or more measurements associated with a transmitter voltage applied to and a transmitter current of each of the one or more transmitters and one or more measurements associated with a receiver voltage of each of the one or more receivers, wherein at least one of the one or more transmitters is located at a position about the corrosion detection tool, and wherein at least one of the one or more receivers is located at the position;

determining one or more impedances associated with the one or more measurements associated with the one or more transmitters and the one or more measurements associated with the one or more receivers;

estimating an average magnetic permeability and electrical conductivity of the at least one pipe to match a numerical model;

deriving one or more constants to match the numerical model that captures nonlinearity of the at least one pipe and the one or more measurements, wherein the numerical model is based, at least in part, on the one or more measurements associated with the one or more transmitters and the at least one pipe at a nominal thickness; and determining a thickness of the pipe based, at least in part, on the one or more derived constants and the one or more determined impedances.

9. The method for determining thickness of the pipe of claim 8, wherein determining the thickness comprises applying a remote field eddy current processing to determine a thickness of the pipe.

10. The method for determining thickness of the pipe of claim 8, wherein determining the thickness comprises applying a numerical inversion to determine the thickness of the pipe.

11. The method for determining thickness of the pipe of claim 8, wherein at least one of the one or more measurements associated with at least one of the one or more receivers comprises a measure of magnetic flux generated by at least one of the one or more transmitters, wherein the at least one of the one or more receivers is located at a location of the at least one of the one or more transmitters.

12. The method for determining thickness of the pipe of claim 11, wherein the one or more receivers comprise a plurality of receivers, and wherein the plurality of receivers are disposed about the one or more transmitters.

13. The method for determining thickness of the pipe of claim 11, wherein the one or more receivers comprise one or more taps, wherein the one or more taps measure one or more voltages.

14. The method for determining thickness of the pipe of claim 8, wherein the one or more transmitters comprise a single transmitter; and wherein the one or more receivers comprise a plurality of receivers.

15. The method for determining thickness of the pipe of claim 8, wherein the numerical model is based, at least in part, on a precomputed stored table.

16. The method for determining thickness of the pipe of claim 8, wherein at least one of the one or more receivers is a bucked receiver; and the method further comprising normalizing a cancellation between a main coil and a bucking coil of the bucked receiver, wherein the one or more constants comprises the normalized cancellation.

17. The method for determining thickness of the pipe of claim 8, further comprising:

applying at least one of a calibration averaging, a filtering and a temperature correction.

18. The method for determining thickness of the pipe of claim 8, further comprising:

deconvolving the one or more impedances.

19. A non-transitory computer readable medium storing a program that, when executed, causes a processor to:

receive one or more measurements associated with a transmitter voltage applied to and a transmitter current of each of one or more transmitters and one or more measurements associated with a receiver voltage of each of one or more receivers, wherein the one or more transmitters and the one or more receivers are disposed about a corrosion detection tool, wherein at least one of the one or more transmitters is located at a position about the corrosion detection tool, and wherein at least one of the one or more receivers is located at the position;

determine one or more impedances associated with the one or more measurements associated with the one or more transmitters and the one or more measurements associated with the one or more receivers;

estimate an average magnetic permeability and electrical conductivity of the at least one pipe to match a numerical model;

derive one or more constants to match the numerical model that captures nonlinearity of the at least one pipe and the one or more measurements, wherein the numerical model is based, at least in part, on the one or more measurements associated with the one or more transmitters and the at least one pipe at a nominal thickness;

deconvolve the one or more impedances; and determine a thickness of the pipe based, at least in part, on the deconvolution and the one or more derived constants.

20. The non-transitory computer readable medium of claim 18, wherein determining the thickness comprises applying at least one of a remote field eddy current processing or a numerical inversion.

\* \* \* \* \*